(12) United States Patent
Hwang et al.

(10) Patent No.: US 8,442,249 B2
(45) Date of Patent: May 14, 2013

(54) HUMAN BODY SOUND TRANSMISSION APPARATUS AND METHOD FOR MINIMIZING SIGNAL LOSS

(75) Inventors: Jung Hwan Hwang, Daejeon (KR); Tae Wook Kang, Daejeon (KR); Sung Eun Kim, Seoul (KR); Sung Weon Kang, Daejeon (KR); Kyung Soo Kim, Daejeon (KR); Jung Bum Kim, Daejeon (KR); Hyung Il Park, Daejeon (KR); Chang Hee Hyoung, Daejeon (KR); Jin Kyung Kim, Daejeon (KR); In Gi Lim, Daejeon (KR); Kyung Hwan Park, Daejeon (KR); Byoung Gun Choi, Daegu (KR); Tae Young Kang, Daejeon (KR); Seok Bong Hyun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 431 days.

(21) Appl. No.: 12/845,158

(22) Filed: Jul. 28, 2010

(65) Prior Publication Data

US 2011/0033068 A1  Feb. 10, 2011

(30) Foreign Application Priority Data

Aug. 6, 2009 (KR) .......................... 10-2009-0072395
Feb. 1, 2010 (KR) .......................... 10-2010-0008995

(51) Int. Cl.
*H04R 25/00* (2006.01)
(52) U.S. Cl.
USPC ........... 381/316; 381/151; 381/315; 381/326; 455/100
(58) Field of Classification Search ................. 381/151, 381/315, 316, 326; 455/100
See application file for complete search history.

(56) References Cited

U.S. PATENT DOCUMENTS

2006/0143004 A1  6/2006  Kim et al.

FOREIGN PATENT DOCUMENTS

| CN | 1132622 A | 10/1996 |
| CN | 1303187 A2 | 7/2001 |
| EP | 1100218 A2 | 5/2001 |
| JP | 2004-364009 A | 12/2004 |

*Primary Examiner* — Ramon Barrera

(57) ABSTRACT

A human body sound transmission apparatus and method for minimizing a signal loss are disclosed. The human body sound transmission apparatus includes: an audio signal transmission unit modulating an audio signal desired to be transmitted, and transmitting the modulated audio signal to the vicinity of a user's ear through the human body (i.e., a user's body); and a carrier wave signal transmission unit transmitting a carrier wave signal for demodulating the modulated audio signal to the vicinity of the user's ear through the air.

18 Claims, 2 Drawing Sheets

HUMAN BODY SOUND TRANSMISSION APPARATUS AND METHOD FOR MINIMIZING SIGNAL LOSS

CROSS-REFERENCE TO RELATED APPLICATIONS

This application claims the priorities of Korean Patent Application Nos. 10-2009-0072395 filed on Aug. 6, 2009 and 10-2010-0008995 filed on Feb. 1, 2010, in the Korean Intellectual Property Office, the disclosures of which are incorporated herein by reference.

BACKGROUND OF THE INVENTION

1. Field of the Invention

The present invention relates to a human body sound transmission apparatus and method for minimizing signal loss and, more particularly, to a technique that transmits a modulated audio signal through a human body and a carrier wave signal for demodulating the audio signal through the air so as to minimize loss within the audio signal due to a nonlinearity phenomenon occurring in parts of the human body other than the ear, thus increasing the amplitude of the audio signal generated near the ear and improving sound quality.

2. Description of the Related Art

In the related art sound transmission system such as an MP3 player, a portable radio set, or the like, a transmission device transmits an audio signal, desired to be transmitted, through a fixed line, or modulates the audio signal and transmits it wirelessly, and a reception device such as an earphone or the like located near a user's ear receives the signal transferred from the transmission device or receives and then demodulates it, thus allowing the user to hear the sound. However, the related art sound transmission system has a problem in that it must necessarily include the reception device and the user can hear sound only when the reception device is in contact with the user's body, thus causing user inconvenience.

In an effort to improve sound transmission system user convenience, a human body sound transmission technique has been proposed to transmit an audio signal through a human body.

According to the proposed human body sound transmission technique, an audio signal desired to be transmitted is amplitude-modulated so as to be converted into a signal of a ultrasonic band of around 20 kHz or higher, and the modulated audio signal is combined with a carrier wave signal which has been used for the modulation, or is converted into a separate ultrasonic wave signal and then applied to the human body.

The human body (i.e., the user) performs a nonlinear operation, as well as a linear operation proportional to the amplitude of a signal input, with respect to the applied ultrasonic wave signal. The nonlinear operation, with respect to two or more signals, may be modeled as the product of the two signals. Namely, when the audio signal desired to be transmitted is m(t) and the amplitude and frequency of the carrier wave signal are $A_c$ and $f_c$, respectively, the audio signal which has been amplitude-modulated by the carrier wave signal may be represented by Equation 1 and Equation 2 as follows:

$$A_c m(t)\cos(2\pi f_c t) \quad \text{[Equation 1]}$$

$$A_c \cos(2\pi f_c t) \quad \text{[Equation 2]}$$

When the two signals represented by Equation 1 and Equation 2 are converted into ultrasonic wave signals and then applied to the user, the two ultrasonic wave signals are frequency-mixed according to the nonlinear operation of the user while being transmitted through the user's body, to generate a signal represented by Equation 3 shown below, which may be then developed by using a sine formula to be represented by Equation 4 shown below:

$$A_c m(t)\cos(2\pi f_c t) \times A_c \cos(2\pi f_c t) \quad \text{[Equation 3]}$$

$$\frac{1}{2}A_c^2 m(t)\cos(4\pi f_c t) + \frac{1}{2}A_c^2 m(t) \quad \text{[Equation 4]}$$

In Equation 4, a first term is a signal of an ultrasonic band, the user cannot hear, and a second term is a signal of an acoustic band, the user can hear. Thus, the foregoing human body sound transmission technique enables the user to hear a transmitted audio signal without having to use a reception device.

However, the human body sound transmission technique has the following problem. That is, as the modulated audio signal and the carrier wave signal are transmitted through the human body, audio signals are generated from all of a user's body parts, as well as from the vicinity of the user's ear, through which the signals pass, due to the nonlinear operation. The audio signals generated from other parts of the human body, excluding the user's ear, become extinct, causing a big loss within the audio signals. Thus, the amplitude of the audio signal generated from the vicinity of the user's ear is very small and its sound quality is not very good.

SUMMARY OF THE INVENTION

An aspect of the present invention provides a human body sound transmission apparatus and method for minimizing signal loss capable of transmitting a modulated audio signal through a human body and a carrier wave signal for demodulating the audio signal through the air to minimize loss within the audio signal due to a nonlinearity phenomenon occurring in parts of the human body other than the ear, thus increasing the amplitude of the audio signal generated near the ear and improving sound quality.

According to an aspect of the present invention, there is provided a human body sound transmission apparatus including: an audio signal transmission unit modulating an audio signal desired to be transmitted, and transmitting the modulated audio signal to the vicinity of a user's ear through the human body (i.e., a user's body); and a carrier wave signal transmission unit transmitting a carrier wave signal for demodulating the modulated audio signal to the vicinity of the user's ear through the air.

The audio signal transmission unit may include: an audio signal generator generating the audio signal desired to be transmitted; an amplitude modulator modulating the amplitude of the audio signal generated by using the carrier wave signal; and a first ultrasonic converter converting the amplitude-modulated audio signal into an ultrasonic wave signal and applying the converted ultrasonic wave signal to the user's body.

The amplitude modulator may perform the amplitude modulation by using the carrier wave signal received from the carrier wave signal transmission unit, or the audio signal transmission unit may include a carrier wave signal generator generating a carrier wave signal, and in this case, the amplitude modulator may perform amplitude modulation by using the carrier wave signal generated by the carrier wave signal generator.

The first ultrasonic wave converter may be in contact with the user.

The carrier wave signal transmission unit may include: a carrier wave signal generator generating a carrier wave signal; and a second ultrasonic wave converter converting the generated carrier wave signal into an ultrasonic wave signal and transmitting the converted ultrasonic wave signal into the air, and may further include a second signal amplifier amplifying the carrier wave signal generated by the carrier wave signal generator and providing the amplified carrier wave signal to the second ultrasonic wave converter.

In this case, the second ultrasonic wave converter may be installed to point toward the air, or may be implemented as a directional ultrasonic wave converter.

According to another aspect of the present invention, there is provided a human body sound transmission method for minimizing a signal loss, including: generating an audio signal desired to be transmitted and a carrier wave signal; modulating the amplitude of the audio signal by using the carrier wave signal; converting the amplitude-modulated audio signal and the carrier signal into ultrasonic wave signals; and transmitting the audio signal, which has been converted into the ultrasonic wave signal, to the vicinity of the user's ear through the user's body and the carrier wave signal, which has been converted into the ultrasonic wave signal, to the vicinity of the user's ear through the air. The method may further include: amplifying the amplitude-modulated audio signal and the carrier signal, respectively, after the amplitude modulation is performed.

The carrier wave signal, which was converted into the ultrasonic wave signal and then transmitted to the vicinity of the user's ear through the air, may be made incident to the user's body in the vicinity of the user's ear, and in this case, the method may further include: frequency-mixing the audio signal and the carrier wave signal, which were converted into the ultrasonic wave signal and then transmitted to the vicinity of the user's ear through the user's body and through the air, respectively, according to a nonlinear operation of the user's body in the vicinity of the user's ear to generate an audio signal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
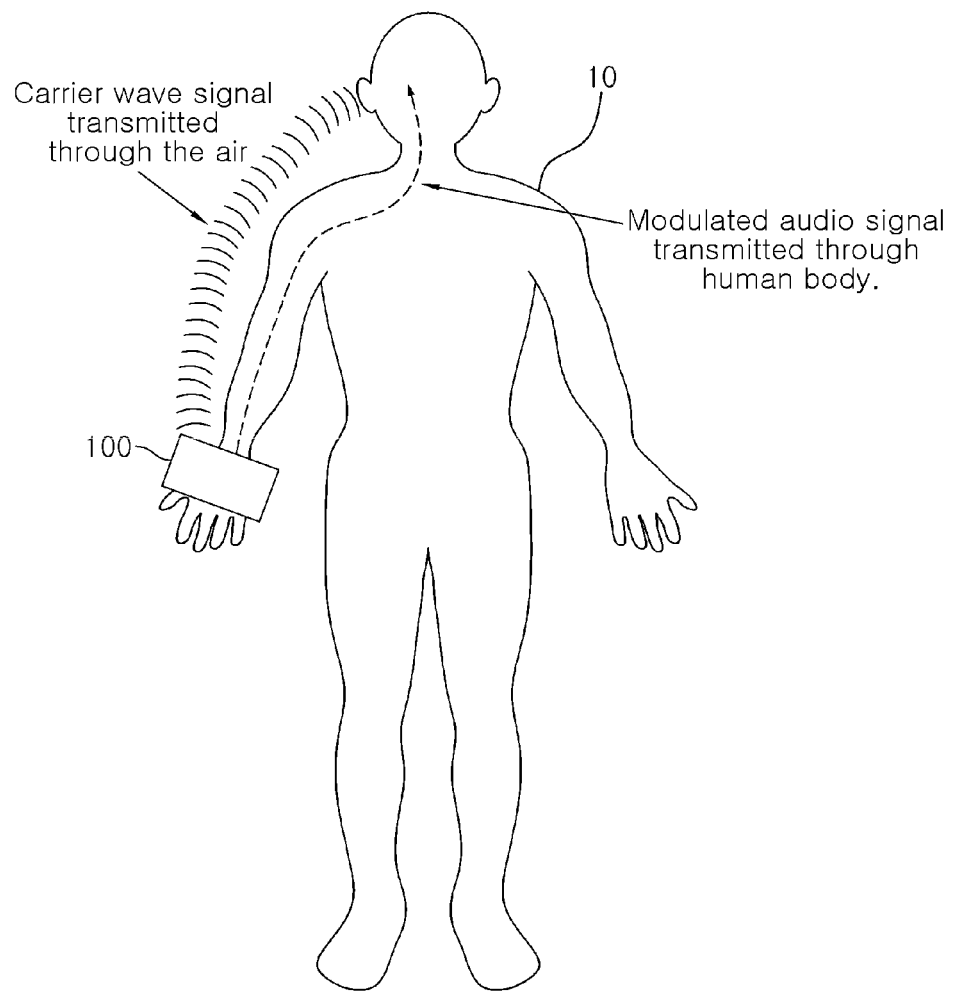
FIG. 1 is a conceptual view for explaining a human body sound transmission apparatus and method for minimizing a signal loss according to an exemplary embodiment of the present invention.

Exemplary embodiments of the present invention will now be described in detail with reference to the accompanying drawings. The invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

It will be understood that when an element is referred to as being "connected with" another element, it can be directly connected with the other element or intervening elements may also be present. In contrast, when an element is referred to as being "directly connected with" another element, there are no intervening elements present. In addition, unless explicitly described to the contrary, the word "comprise" and variations such as "comprises" or "comprising," will be understood to imply the inclusion of stated elements but not the exclusion of any other elements.

FIG. 1 is a conceptual view for explaining a human body sound transmission apparatus and method for minimizing a signal loss according to an exemplary embodiment of the present invention.

In an exemplary embodiment of the present invention, in order to minimize a loss of an audio signal appearing in parts of a human body (i.e., a user's body) other than a user's ear due to a nonlinear phenomenon, a human body sound transmission apparatus 100 transmits a modulated audio signal and a carrier signal through separate, independent mediums, respectively.

In detail, the human body sound transmission apparatus 100 transmits the modulated audio signal to the vicinity of the user's ear through the user's body 10 and the carrier wave signal through the air so as to be made incident to the user's body 10 in the vicinity of the user's ear.

Accordingly, the modulated audio signal and the carrier wave signal, which have been transmitted by the human body sound transmission apparatus 100, are met in the vicinity of the user's ear to generate an audio signal according to a nonlinear operation of the user's body, allowing the user to hear the audio signal (i.e., a corresponding sound).

Figure 2:
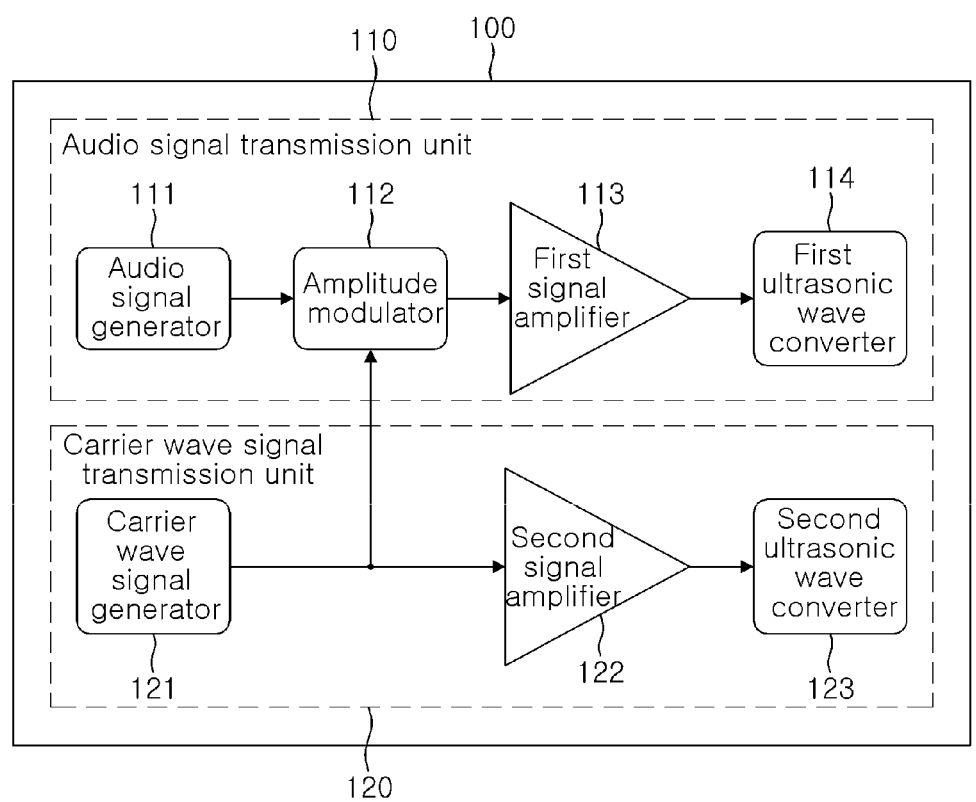
FIG. 2 is a schematic block diagram of the human body sound transmission apparatus according to an exemplary embodiment of the present invention.

FIG. 2 is a schematic block diagram of the human body sound transmission apparatus according to an exemplary embodiment of the present invention. The human body sound transmission apparatus 100 includes an audio signal transmission unit 110 that transmits the modulated audio signal through the user's body and a carrier wave signal transmission unit 120 that transmits the carrier wave signal through the air.

The audio signal transmission unit 110 is configured to include an audio signal generator 111, an amplitude modulator 112, a first signal amplifier 113, and a first ultrasonic wave converter 114.

The audio signal generator 111 generates an audio signal desired to be transmitted.

The amplitude modulator 112 receives the audio signal which has been generated by the audio signal generator 111, and modulates the amplitude of the received audio signal. In this case, the amplitude modulator 112 performs amplitude modulation on the audio signal by using the carrier signal which has been generated by the carrier wave signal generator 121.

In FIG. 2, the carrier wave signal generator 121 is illustrated such that it is included in the carrier wave signal transmission unit 120, but the present invention is not limited thereto, and it may be implemented such that the carrier wave signal generator is included in the audio signal transmission unit 110 and the carrier wave signal transmission unit 120 receives a carrier wave signal generated by the audio signal transmission unit 110 and transmits the received carrier wave signal.

The first signal amplifier 113 amplifies the audio signal which has been modulated by the amplitude modulator 112 such that the audio signal has amplitude sufficient to allow it to be transmitted to the vicinity of the user's ear through the user' body.

The first ultrasonic wave converter 114 converts the modulated audio signal, which has been amplified by the first signal amplifier 113, into an ultrasonic wave signal, and applies the converted ultrasonic wave signal to the user's body. To this end, preferably, the first ultrasonic wave converter 114 is in contact with the user's body.

The modulated audio signal, which has been applied to the user's body by the audio signal transmission unit 110, configured as described above, is transmitted to the vicinity of the user's ear through the user's body.

Meanwhile, the carrier wave signal transmission unit 120 is configured to include a carrier wave signal generator 121, a second signal amplifier 122, and a second ultrasonic wave converter 123.

The carrier wave signal generator 121 generates the carrier wave signal to be used for modulating the amplitude of the audio signal by the amplitude modulator 112 of the audio signal transmission unit 110. As mentioned above, the carrier wave signal generator 121 may be included in the audio signal transmission unit 110, not in the carrier wave signal transmission unit 120.

The second signal amplifier 122 amplifies the carrier wave signal which has been generated by the carrier wave signal generator 121.

The second ultrasonic wave converter 123 converts the carrier wave signal, which has been amplified by the second signal amplifier 122, into an ultrasonic wave signal and transmits the converted ultrasonic wave signal to the vicinity of the user's ear through the air. To this end, preferably, the second ultrasonic wave converter 123 is installed to point toward the air in the human body sound transmission apparatus 100.

In addition, in order to prevent the transmitted ultrasonic wave signal from dissipating in the air, and in order to transmit the ultrasonic wave signal such that it is concentrated to the vicinity of the user's ear, a directional ultrasonic wave converter is preferably used as the second ultrasonic wave converter 123.

The signal, which has been transmitted in the air by the carrier wave signal transmission unit 120 configured as described above, is transmitted to the vicinity of the user's ear and then made incident to the user's body in the vicinity of the user's ear.

A method for transmitting a human body sound by using the human body sound transmission apparatus according to an exemplary embodiment of the present invention will now be described with reference to FIG. 2.

First, the audio signal generator 111 generates an audio signal desired to be transmitted, and the carrier wave signal generator 121 generates a carrier wave signal to be used for modulating the amplitude of the audio signal.

Next, the amplitude modulator 112 receives the audio signal which has been generated by the audio signal generator 111 and the carrier wave signal which has been generated by the carrier wave signal generator 121, and performs amplitude modulation on the audio signal by using the carrier wave signal.

And then, the first and second signal amplifiers 113 and 122 amplify the modulated audio signal and the carrier wave signal, respectively, such that they have a size sufficient to be transmitted to the vicinity of the user's ear through the user's body or through the air.

Thereafter, the first ultrasonic wave converter 114 converts the amplified modulated audio signal into an ultrasonic wave signal and transmits the converted ultrasonic wave signal to the vicinity of the user's ear through the user's body, and the second ultrasonic wave converter 123 converts the amplified carrier wave signal into an ultrasonic wave signal and transmits the converted ultrasonic wave signal to the vicinity of the user's ear through the air. Then, the ultrasonic wave signal, which has been transmitted to the vicinity of the user's ear through the air, is made incident to the user's body in the vicinity of the user's ear.

The audio signal and the carrier wave signal, which have been transmitted to the vicinity of the user's ear through the user's body and through the air as described above, are frequency-mixed in the vicinity of the user's ear according to the nonlinear operation of the user's body to generate an audio signal, and the user can hear the generated audio signal.

As set forth above, according to exemplary embodiments of the invention, because the modulated audio signal is transmitted through the user's body and the carrier wave signal to be used for modulating the audio signal is transmitted through the air, a loss of the audio signal appearing in parts of the user's body other than the user's ear due to the nonlinear phenomenon can be minimized. Therefore, the amplitude of the audio signal generated in the vicinity of the user's ear can be increased and its sound quality can be improved.

While the present invention has been shown and described in connection with the exemplary embodiments, it will be apparent to those skilled in the art that modifications and variations can be made without departing from the spirit and scope of the invention as defined by the appended claims.

What is claimed is:

1. A human body sound transmission apparatus comprising:
   an audio signal transmission unit modulating an audio signal desired to be transmitted, and transmitting the modulated audio signal to the vicinity of a user's ear through a user's body; and
   a carrier wave signal transmission unit transmitting a carrier wave signal to be used for demodulating the modulated audio signal to the vicinity of the user's ear through the air.

2. The apparatus of claim 1, wherein the audio signal transmission unit comprises:
   an audio signal generator generating the audio signal desired to be transmitted;
   an amplitude modulator modulating the amplitude of the audio signal generated by using the carrier wave signal; and
   a first ultrasonic converter converting the amplitude-modulated audio signal into an ultrasonic wave signal and applying the converted ultrasonic wave signal to the user's body.

3. The apparatus of claim 2, wherein the amplitude modulator performs the amplitude modulation by using the carrier wave signal received from the carrier wave signal transmission unit.

4. The apparatus of claim 2, wherein the audio signal transmission unit comprises a carrier wave signal generator generating a carrier wave signal, and the amplitude modulator performs amplitude modulation by using the carrier wave signal generated by the carrier wave signal generator.

5. The apparatus of claim 2, wherein the first ultrasonic wave converter is in contact with the user's body.

6. The apparatus of claim 2, wherein the audio signal transmission unit further comprises a first signal amplifier amplifying the audio signal whose amplitude has been modulated by the amplitude modulator and providing the amplified audio signal to the first ultrasonic wave converter.

7. The apparatus of claim 1, wherein the carrier wave signal transmission unit comprises:
a carrier wave signal generator generating a carrier wave signal; and
a second ultrasonic wave converter converting the generated carrier wave signal into an ultrasonic wave signal and transmitting the converted ultrasonic wave signal into the air.

8. The apparatus of claim 7, wherein the second ultrasonic wave converter is installed to point toward the air.

9. The apparatus of claim 7, wherein the second ultrasonic wave converter is implemented as a directional ultrasonic wave converter.

10. The apparatus of claim 7, wherein carrier wave signal transmission unit further comprises a second signal amplifier amplifying the carrier wave signal which has been generated by the carrier wave signal generator and providing the amplified carrier wave signal to the second ultrasonic wave converter.

11. The apparatus of claim 4, wherein the carrier wave signal transmission unit comprises a second ultrasonic wave converter converting the carrier wave signal, which has been generated by the carrier wave signal generator, into an ultrasonic wave signal, and transmitting the converted ultrasonic wave signal into the air.

12. The apparatus of claim 11, wherein the second ultrasonic wave converter is installed to point toward the air.

13. The apparatus of claim 11, wherein the second ultrasonic wave converter is implemented as a directional ultrasonic wave converter.

14. The apparatus of claim 11, wherein the carrier wave signal transmission unit further comprises a second signal amplifier amplifying the carrier wave signal which has been generated by the carrier wave signal generator and providing the amplified carrier wave signal to the second ultrasonic wave converter.

15. A human body sound transmission method comprising:
generating an audio signal desired to be transmitted and a carrier wave signal;
modulating the amplitude of the audio signal by using the carrier wave signal;
converting the amplitude-modulated audio signal and the carrier signal into ultrasonic wave signals; and
transmitting the audio signal, which has been converted into the ultrasonic wave signal, to the vicinity of the user's ear through the user's body and the carrier wave signal, which has been converted into the ultrasonic wave signal, to the vicinity of the user's ear through the air.

16. The method of claim 15, wherein the carrier wave signal, which was converted into the ultrasonic wave signal and then transmitted to the vicinity of the user's ear through the air, is made incident to the user's body in the vicinity of the user's ear.

17. The method of claim 16, further comprising:
frequency mixing the audio signal and the carrier wave signal, which were converted into the ultrasonic wave signal and then transmitted to the vicinity of the user's ear through the user's body and through the air, respectively, according to a nonlinear operation of the user's body in the vicinity of the user's ear to generate an audio signal.

18. The method of claim 15, further comprising:
amplifying the amplitude-modulated audio signal and the carrier signal, respectively, after the amplitude modulation is performed.

* * * * *